(12) United States Patent
Goel et al.

(10) Patent No.: US 9,378,275 B1
(45) Date of Patent: Jun. 28, 2016

(54) LEAD GENERATION SYSTEM AND METHODS

(71) Applicant: Google Inc., Mountain View, CA (US)

(72) Inventors: Vinay Goel, Bangalore (IN); Kiran S. Panesar, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 14/103,581

(22) Filed: Dec. 11, 2013

Related U.S. Application Data

(63) Continuation of application No. 13/182,256, filed on Jul. 13, 2011, now Pat. No. 8,612,459.

(51) Int. Cl.
*G06F 17/30* (2006.01)
*G06Q 30/02* (2012.01)

(52) U.S. Cl.
CPC .... *G06F 17/30699* (2013.01); *G06F 17/30864* (2013.01); *G06F 17/3064* (2013.01); *G06F 17/30867* (2013.01); *G06Q 30/0241* (2013.01); *G06Q 30/0275* (2013.01)

(58) Field of Classification Search
CPC ............... G06F 17/30867; G06F 17/30864; G06F 17/3053; G06F 17/30646; G06F 17/30693; G06F 17/30731
USPC .......... 707/723, 726, 748, 754, 766, 771, 798
See application file for complete search history.

(56) References Cited

U.S. PATENT DOCUMENTS

| | | | |
|---|---|---|---|
| 7,849,080 B2 * | 12/2010 | Chang | G06Q 30/02 707/706 |
| 7,895,235 B2 | 2/2011 | Baeza-Yates | |
| 7,945,566 B2 | 5/2011 | James | |
| 7,979,415 B2 * | 7/2011 | Shen | G06F 17/3064 707/706 |
| 8,069,082 B2 * | 11/2011 | Altberg | G06Q 30/02 705/14.7 |
| 8,073,867 B2 | 12/2011 | Chowdhury | |
| 8,364,540 B2 * | 1/2013 | Soroca | G06F 17/30035 705/14.64 |
| 8,843,395 B2 * | 9/2014 | Ramer | G06Q 30/02 705/14.49 |
| 2006/0149625 A1 * | 7/2006 | Koningstein | G06Q 30/02 705/14.54 |
| 2009/0006351 A1 | 1/2009 | Stephenson | |
| 2009/0192983 A1 * | 7/2009 | Elango | G06F 17/3064 707/999.003 |
| 2009/0198684 A1 | 8/2009 | Collins | |
| 2010/0057556 A1 * | 3/2010 | Rousso | G06Q 30/02 705/14.44 |
| 2010/0082608 A1 | 4/2010 | Mediano | |
| 2011/0213655 A1 | 9/2011 | Henkin | |
| 2011/0302155 A1 | 12/2011 | Yan | |

* cited by examiner

*Primary Examiner* — Dangelino Gortayo

(74) *Attorney, Agent, or Firm* — Fish & Richardson P.C.

(57) ABSTRACT

Methods, systems, and computer program products are provided for providing matching resources. One example method includes identifying example resources, evaluating query logs to determine queries including query terms that resolved to a given example resource, identifying matching resources other than the example resources that also were provided as a solution to the determined queries, filtering the matching resources based on one or more criteria to identify matching resources that are relevant to a consumer, and providing the filtered matching resources for output to the consumer.

18 Claims, 5 Drawing Sheets

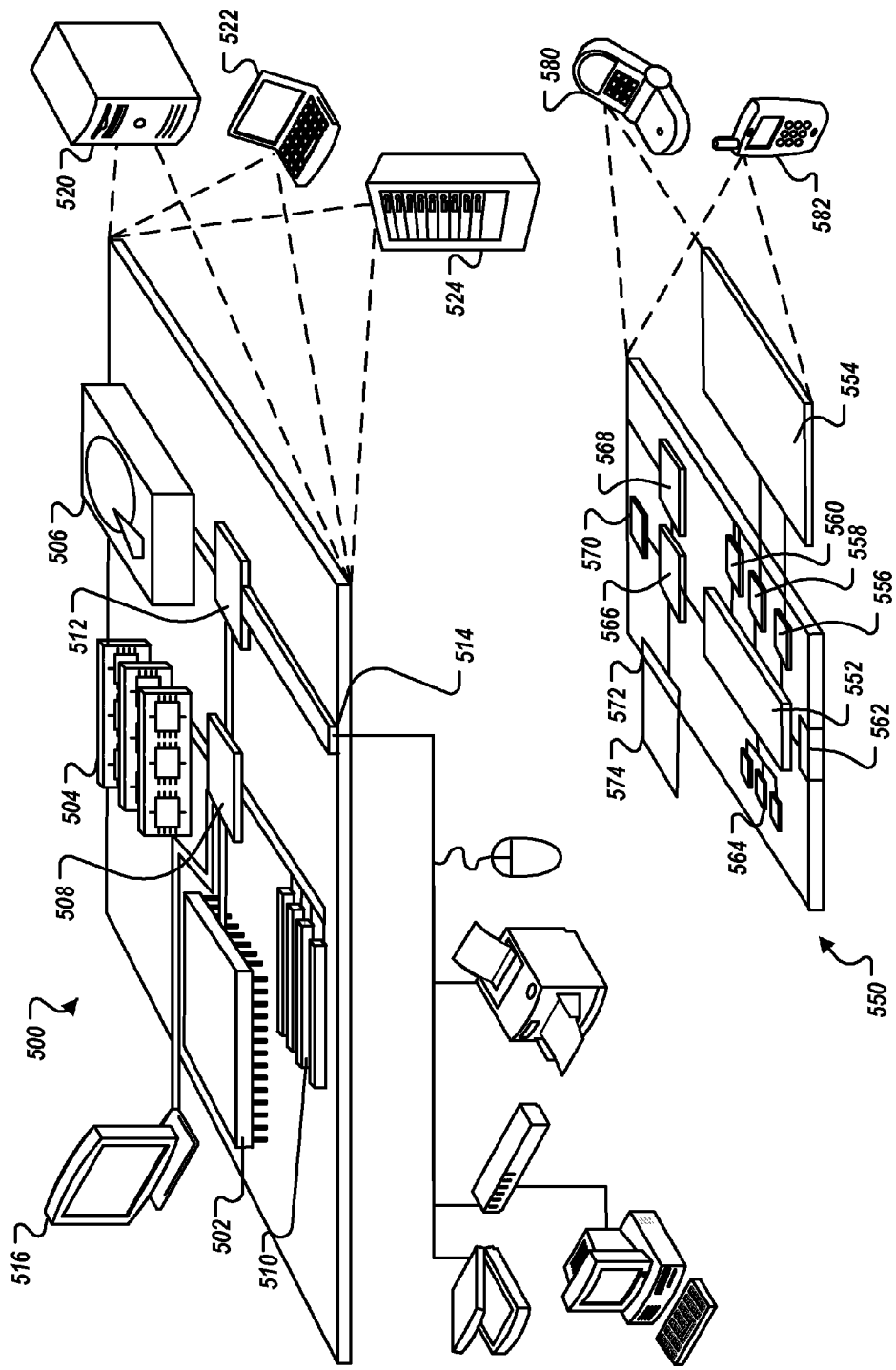

LEAD GENERATION SYSTEM AND METHODS

CROSS-REFERENCE TO RELATED APPLICATION

This application is a continuation application of U.S. application Ser. No. 13/182,256, filed Jul. 13, 2011, the disclosure of which is hereby incorporated by reference in its entirety.

BACKGROUND

This specification generally relates to information presentation.

Users of the Internet and search engines can use such tools to perform research related to businesses and other organizations. Additionally, some organizations maintain websites for providing public information to interested parties.

SUMMARY

In general, one innovative aspect of the subject matter described in this specification may be embodied in methods, systems, and computer program products for providing matching resources. One example method includes identifying example resources, evaluating query logs to determine queries including query terms that resolved to a given example resource, identifying matching resources other than the example resources that also were provided as a solution to the determined queries, filtering the matching resources based on one or more criteria to identify matching resources that are relevant to a consumer, and providing the filtered matching resources for output to the consumer.

In general, another innovative aspect of the subject matter described in this specification may be embodied in a method that includes identifying example resources, and for each example resource, evaluating one or more advertiser creatives, advertiser keywords, or query logs to identify one or more matching resources other than the example resources that are a match based on the advertiser creatives, advertiser keywords, or query logs. The one or more matching resources are filtered based on one or more criteria, and the filtered matching resources are provided for output to a consumer.

In general, another innovative aspect of the subject matter described in this specification may be embodied in resource providing systems that include resource identifiers, content evaluators, query log evaluators, matching resource identifiers, and matching resource filters. A resource identifier can identify example resources. A content evaluator can evaluate content associated with example resources. A query log evaluator can evaluate query logs for example resources to determine queries including query terms that resolved a given example resource. A matching resource identifier can identify matching resources other than the example resource that also were provided as a solution to the determined queries. A matching resource filter can filter matching resources based on one or more criteria.

These and other embodiments may each optionally include none, one or more of the following features. In various examples, identifying example resources can include receiving example resources from a user. The example resources can be websites, and can include content, text, keywords, and information associated with organizations and/or individuals. Receiving example resources can include receiving example resources that are being targeted to locate similar resources. Filtering can be based at least in part on geo-location of a sponsor associated with the example resources. Filtering can be based at least in part on a size of a business associated with the example resources and can include filtering out businesses associated with matching resources that are a different size. Filtering can be based at least in part on spend data associated with a sponsor of the example resources and can include filtering out sponsors of matching resources that have spend data that is substantially different from the spend data associated with the sponsor of the example resources. Filtering can be based at least in part on a number of historical clicks in a time period associated with matching resources. Filtering can include removing irrelevant businesses from the matching resources. Filtering can include removing directories from the matching resources. Filtering can include determining a vertical classification associated with the example resources and filtering out matching resources that do not match the vertical classification. Filtering can include ranking matching resources. Ranking the matching resources can based at least in part on a frequency of the matching resource being returned in response to the one or more queries.

The query logs can include organic search results derived from the submission of queries to a search engine. The query logs can be evaluated and one or more words identified from the queries can be removed prior to locating matching resources. A sponsor of the matching resources can be identified and sponsor information can be provided to the consumer. Sponsor information can include contact information for the matching resource. Sponsors of the matching resources can be advertisers. The consumer can be a sales representative and the matching resources can be sales leads.

Particular embodiments of the subject matter described in this specification may be implemented to realize none, one or more of the following advantages. Based on one or more example resources, one or more similar matching resources can be provided. Users can be provided with leads for businesses to target as potential customers.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 5 shows an example of a computer device and a mobile computer device that can be used to implement the techniques described here.

Like reference symbols in the various drawings indicate like elements.

DETAILED DESCRIPTION

In general, computer systems can provide one or more resources (e.g., websites, content, text, keywords, information associated with organizations or individuals, etc.) that are similar to one or more example resources (e.g., a list of known websites). For example, based on a web site address provided by a user, query logs can be evaluated to determine search queries that were previously submitted by users to locate the web site (e.g., the example resource). Similar websites can be identified by evaluating the query logs and/or content associated with the resource, and can be provided to the user (e.g., the system can provide resources that are similar to the example resource). Thus, by providing web site addresses for businesses, users can receive information associated with similar businesses. Such information may be useful for generating leads for businesses to target as potential customers, for example. As another example, techniques for gathering such information may be implemented in various enterprise applications, including customer relationship management (CRM) applications.

Figure 1:
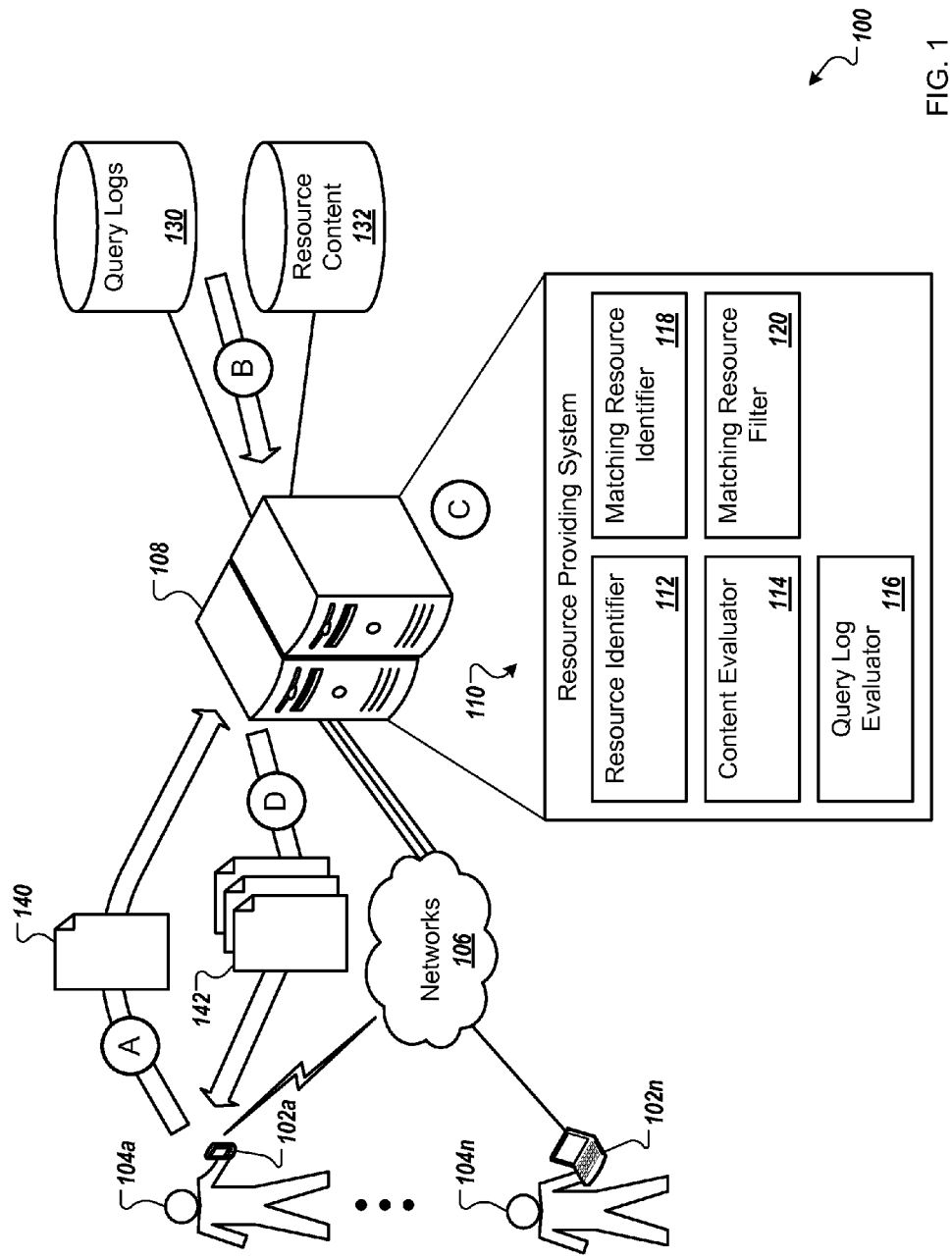
FIG. 1 is a diagram of an example system that can provide resources.

FIG. 1 is a diagram of an example system 100 that can provide resources. FIG. 1 also illustrates an example flow of data within the system 100 during states (A) to (D), where the states (A) to (D) may occur in the illustrated sequence, or they may occur in a sequence that is different than in the illustrated sequence.

In further detail, the system 100 includes one or more client computing devices 102 (each operated by a corresponding user 104) that communicate over one or more networks 106 with one or more computing servers 108. The networks 106 may include a wireless cellular network, a wireless local area network (WLAN) or WiFi network, a Third Generation (3G) or Fourth Generation (4G) mobile telecommunications network, or any other suitable network or any appropriate combination thereof.

The client device(s) 102 may be any suitable type of computing device (e.g., mobile phone, smart phone, PDA, tablet computer, laptop or desktop computer, or other stationary or portable device) that includes one or more processors and computer readable media. Among other components, for example, the client device(s) 102 includes one or more processors, computer readable media that store software applications, input device(s) (e.g., touch screens, keyboards, computer mice, motion sensors, microphones, and the like), output device(s) (e.g., display screens, speakers, and the like), and communications interfaces.

The computing server(s) 108 may be configured to execute application code associated with a variety of software components (e.g., modules, objects, libraries, services, and the like), including computer instructions to perform some or all of the method steps described below. In some implementations, the computing server(s) 108 may include one or more components of a resource providing system 110 described below.

The resource providing system 110 provides resources to consumers (e.g., users, salespersons, researchers, enterprise applications, etc.) and can include a resource identifier 112, a content evaluator 110, a query log evaluator 116, a matching resource identifier 118, and a matching resource filter 120. Two or more of the components 112, 114, 116, 118, and 120 may be implemented on the same device (e.g., same computing device), or on different devices, such as devices included in a server farm or a peer-to-peer network. The resource providing system 110 and server(s) 108 can be in communication with one or more data storage devices, including a query log data store 130 and a resource content data store 132. The data stores 130, 132 can implement databases, file systems, and the like to add, remove, and maintain data used by the system 100.

Referring to the example flow of data, during state (A), one or more example resources can be received and/or identified. For example, the user 104a can employ the client device 102a to provide an example resource 140 (e.g., a web site address, a document, a sound, picture, or video file, an identifier of an organization or an individual, etc.) to the computing server(s) 108 via the networks 106. The resource providing system 110 can receive the example resource 140, for example, and can use the resource identifier 112 to identify the resource. For example, the example resource 140 may be identified as a website, a particular type of content (e.g., text, audio, graphical, etc.), or as being associated with a particular organization or individual.

During state (B), query log information and/or resource content information can be received/identified and evaluated. Query logs, such as Internet search queries previously submitted by users 102, for example, can be provided to the resource providing system 110 by the query logs data store 130, and can be evaluated by the query log evaluator 116. By evaluating query log information, for example, the query log evaluator 116 can determine one or more queries including one or more query terms that have resolved to the example resource 140. Resource content information, such as creatives and/or keywords associated with organizations, individuals, or websites, for example, can be provided by the resource content data store 132, and can be evaluated by the content evaluator 114. By evaluating resource content information, for example, the content evaluator 114 can identify creatives and/or keywords (e.g., as related to an advertising campaign) associated with the example resource 140.

During state (C), one or more matching resources can be identified. For example, using the query logs, the matching resource identifier 118 can identify one or more matching resources 142 that also were provided as a solution to the one or more queries (e.g., resources that were provided as being responsive to queries previously submitted by users) based on the queries determined by the query log evaluator 116. As another example, the matching resource identifier 118 can identify one or more matching resources 142 based at least in part on the resources being associated with similar creatives and/or keywords as the example resource 140. The matching resource(s) 142 can be filtered by the matching resource filter 120, for example, based on one or more criteria to identify matching resources that may be relevant to consumers. Filtering criteria, for example, may include criteria associated with the example resource 140, the matching resources 142, and/or entities (e.g., organizations, individuals, businesses, advertisers, etc.) associated with the resources 140, 142.

During state (D), matching resources can be provided to consumers. For example, the resource providing system 110 can provide the matching resources 142 to the user 104a via the computing server(s) 108, the networks 106, and the client computing device 102a. Upon receiving information associated with the matching resources 142, for example, the client computing device 102a can present such information to the user 104a via a user interface. Thus, based on one or more example resources, one or more similar matching resources can be provided to consumers.

Figure 2:
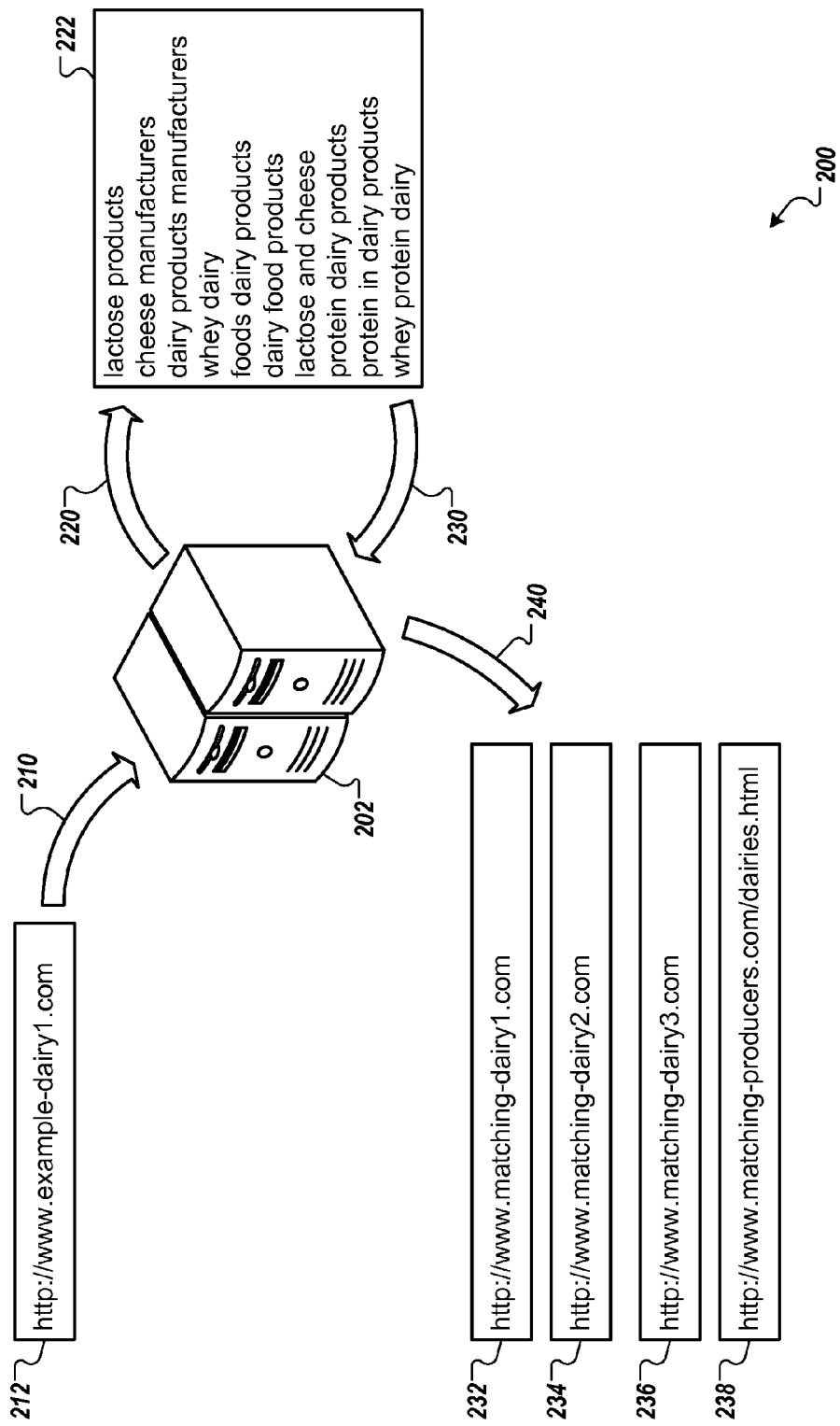
FIG. 2 is a diagram of an example system that can identify and provide matching resources for example resources.

FIG. 2 is a diagram of an example system 200 that can identify and provide matching resources for example resources. In some implementations, the system 200 may be included in or may be in communication with the system 100 (shown in FIG. 1). For example, the system 200 can include a resource providing system 202 that can be configured to perform some or all of the functions of the resource providing system 110 (also shown in FIG. 1).

As shown by arrow 210, an example resource 212 can be received and identified by the resource providing system 202. For example, the example resource 212 can include a web site address "http://www.example-dairy1.com". As shown by arrow 220, the resource providing system 202 can evaluate query logs (e.g., provided by the query logs data store 130, shown in FIG. 1) to determine one or more queries 222 that resolved to the example resource 212. For example, the queries 222 can include query terms (e.g., "lactose products", "cheese manufacturers", "dairy products manufacturers", etc.) previously provided for locating the web site associated with the address "http:www.example-dairy1.com".

As shown by arrow 230, using the query logs, the resource providing system 202 can identify matching resources other than the example resource 212 that were also provided as a solution to the queries 222. For example, one or more of the queries 222 may have resolved to one or more resources other than the example resource 212, including matching resource 232 (e.g., a web site associated with the address "http://www.matching-dairy1.com"), 234 (e.g., a web site associated with the address "http://www.matching-dairy2.com"), 236 (e.g., a web site associated with the address "http://www-.matching-dairy3.com"), and 238 (e.g., a web site associated with the address "http://www.matching-producers.com/dairies.html").

Matching resources can be filtered by the resource providing system 202 based on one or more criteria, to identify relevant matching resources. For example, characteristics of matching resources and/or characteristics of entities associated with matching resources may be considered when applying criteria. As another example, characteristics of example resources and/or characteristics of entities associated with example resources may be compared with corresponding characteristics of matching resources and/or entities when applying criteria. Criteria used for filtering are discussed in further detail below. As shown by arrow 240, in the present example, some or all of the matching resources 232, 234, 236, and 238 can be provided by the resource providing system 202 as output to a consumer.

Figure 3:
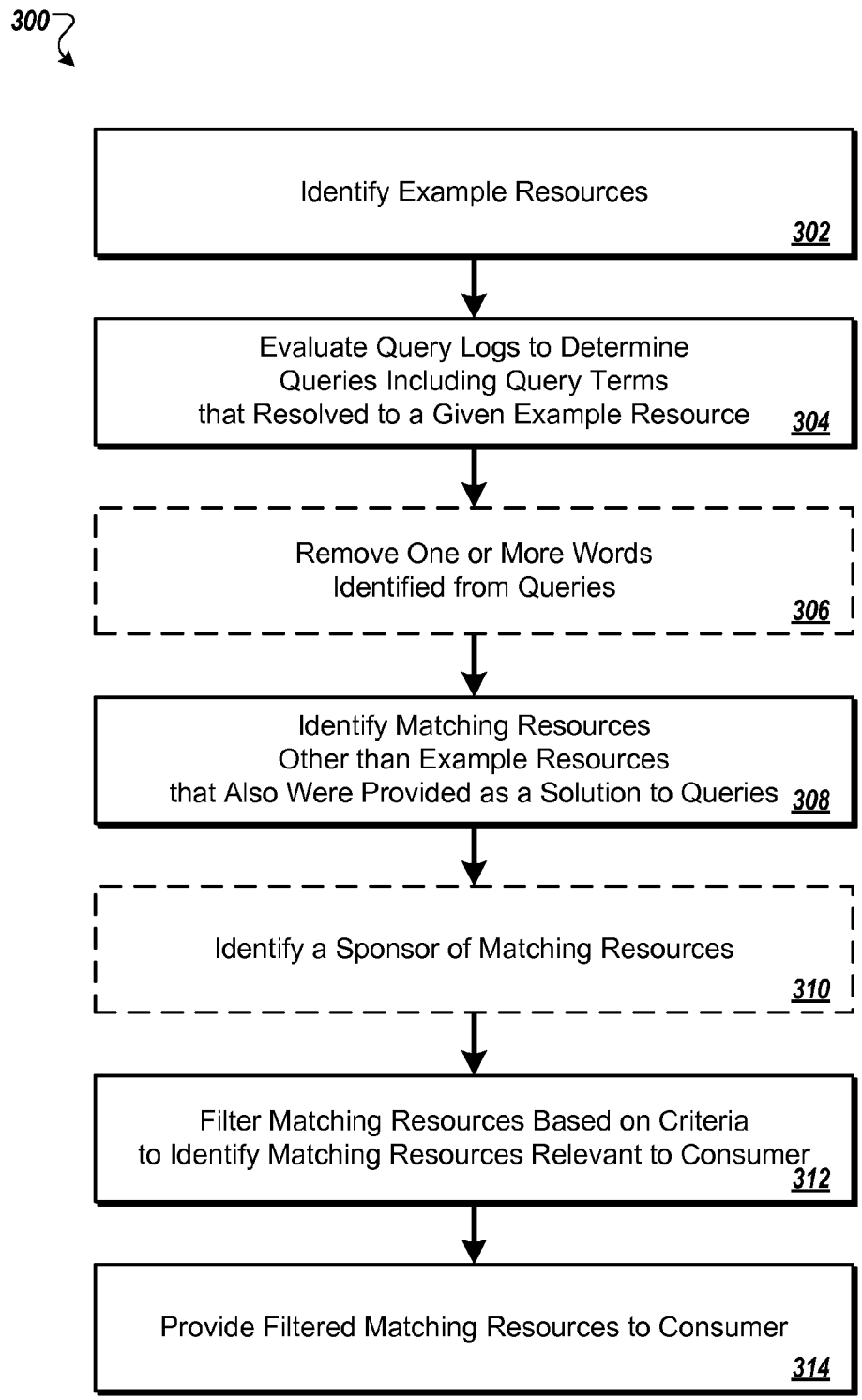
FIGS. 3 and 4 are flowcharts of example processes for providing resources.

FIG. 3 is a flowchart of an example process 300 for providing resources. In some implementations, the process 300 may be performed by the systems 100, 200, and will be described as such for the purpose of clarity. Briefly, the process 300 includes identifying example resources, evaluating query logs to determine queries including query terms that have resolved to a given example resource, identifying matching resources other than example resource that also were provided as a solution the queries, filtering the matching resources based on one or more criteria to identify matching resources that are relevant to a consumer, and providing filtered matching resources to the consumer.

One or more example resources can be identified (302). For example, the resource identifier 112 can identify resources (e.g., websites, content, text, keywords, information associated with organizations or individuals, etc.) received by the resource providing system 110. In some implementations, one or more example resources may be received from a user. For example, the user 104a (e.g., a sales representative) can employ an interface generated by the client computing device 102a to provide resources to the resource providing system 110 via the networks 106. In some implementations, the resources may include websites, keywords, and/or text. For example, the user 104a can indicate one or more website addresses associated with websites that are being targeted to locate similar websites. As another example, the user 104a can indicate one or more keywords associated with websites (or used to access websites) that are being targeted to locate similar websites. As another example, the user 104a can indicate text describing one or more resources (e.g., websites) that are being targeted to locate similar resources.

For each example resource, query logs can be evaluated (304) to determine one or more queries including one or more query terms that resolved to a given example resource. For example, the query log evaluator 116 can evaluate query log information provided by the query logs data store 130 to determine such queries. In some implementations, the query logs may include organic search results derived from the submission of the one or more queries to a search engine. For example, users 104 can employ web browsers presented by client computing devices 102 to interact with Internet search engines. The users 104 can provide queries to and receive search results from search engines, for example, and query logs associated with the interactions can be evaluated to identify associations between queries and web resources. Referring to FIG. 2, for example, one or more of queries 222 may have been provided to a search engine by users 104 for receiving search results including the resource 212.

In some implementations, evaluating query logs may include removing (306) one or more words identified from the queries prior to locating matching resources. For example, some of the queries 222 may include generic words (e.g., "and", "in", etc.) that may be removed prior to performing resource matching operations. As another example, some of the queries 222 may include infrequent terms that may be removed. As another example, some of the queries 222 may include terms associated with spam queries, and such terms may be removed.

Using the query logs, one or more matching resources other than the example resources can be identified (308) that also were provided as a solution to the one or more queries. For example, the matching resource identifier 118 can perform such resource matching operations. Referring to FIG. 2, for example, the matching resources 232, 234, 236, and 238 may have been a match based on one or more of the queries 222. In some implementations, a sponsor of the matching resources may be identified (310). For example, sponsors (e.g., organizations, businesses, advertisers, etc.) associated with each of the matching resources 232, 234, 236, and 238 can be identified by accessing website registries or by another suitable technique. In some implementations, additional sponsor information can be identified. For example, sponsor information may include contact information (e.g., addresses, phone numbers, e-mail addresses, social networking accounts, etc.), profile information (e.g., a number of individuals associated with an organization, goods and services provided by the organization, etc.), financial information (e.g., sales, profits, etc.), and information pertaining to key individuals associated with sponsors. Sponsor information may be identified by the content evaluator 114, for example, by accessing websites associated with references, by accessing providers of sponsor-related data, or by another suitable technique.

The one or more matching resources can be filtered (312) based on one or more criteria to identify matching resources that are relevant to a consumer. For example, the matching resource filter 120 can perform various filtering operations described below, based on criteria provided by the user(s) 104. Referring to FIG. 2, in the present example, the matching resources 232, 234, 236, and 238 may be filtered.

In some implementations, filtering may include ranking the matching resources. For example, the matching resource filter 120 can rank the matching resources 232, 234, 236, and 238 by similarity to the example resource 212, by one or more characteristics (e.g., counts of individuals associated with organizations, sales numbers, budget numbers, etc.), by popularity (e.g., how frequently the resource is referenced by users), or another metric. In some implementations, ranking the matching resources may be based at least in part on a frequency of the matching resource being returned in response to the one or more queries. For example, if the matching resource 232 is returned by a search engine more frequently and/or with a higher ranking than other matching resources 234, 236, 238 in response to the queries 222, the matching resource 232 may receive a higher ranking by the matching resource filter 120. As another example, if the matching resource 232 is selected more frequently than other matching resources 234, 236, 238 when presented to users in search results, the matching resource 232 may receive a higher ranking.

In some implementations, filtering may be based at least in part on a number of historical clicks in a time period associated with matching resources. For example, if the matching resource 232 were to receive less clicks (e.g., to be selected less frequently when presented to users in search results) than other matching resources 234, 236, 238 over a particular time period (e.g., over the course of a month, a week, a day, etc.), the matching resource 232 may be filtered from the matching search results by the matching resource filter 120. As another example, if an advertisement associated with the matching resource 232 were to have a lesser clickthrough rate (CTR) than other matching resources 234, 236, 238 over a time period, the matching resource 232 may be filtered from the matching search results.

In some implementations, filtering may include removing directories from the matching resources. For example, the matching resource filter 120 can identify the matching resource 238 as a directory website, and can filter the resource from other matching resources. Directory websites, for example, can be identified by the content evaluator 114 by analyzing website content associated with references, by referencing lists of known directory websites, or by another suitable technique.

In some implementations, filtering may include determining a vertical classification (or other business cluster information) associated with the example resources and filtering out matching resources that do not match the classification. For example, the content evaluator 114 may determine that the example resource 212 and matching resources 232, 234 are associated with a vertical classification such as "dairy food producer", and that matching resource 236 is associated with a vertical classification such as "dairy equipment supplier". In the present example, based on such classifications, the matching resource filter 120 can filter out matching resource 236, as its vertical classification does not match the vertical classification of the example resource 212.

In some implementations, irrelevant resources (e.g., different businesses or services that are related to the query but unrelated to the example resources) may be removed from the matching resources. For example, various characteristics (e.g., geo-location, size, spend data, etc.) of businesses associated with the matching resources 232, 234, 236, and 238 can be evaluated and compared by the matching resource filter 120 for relevancy to potential consumers of the resources.

In some implementations, filtering may be based at least in part on a geo-location of a sponsor (e.g., organization, business, advertiser) associated with the one or more example resources. For example, the geo-location (e.g., country, state, region, metro area, city, etc.) of a sponsor associated with the example resource 212 can be identified by the resource providing system 110 and compared with the geo-locations of sponsors associated with the matching resources 232, 234, 236. Matching resources associated with sponsors from different geo-locations than the sponsor of the example resource 212 can be filtered out by the matching resource filter 120, for example. As another example, the geo-location of the user 104a can be identified (e.g., by global positioning capabilities of the client computing device 102a), and compared with geo-locations of sponsors associated with the matching resources 232, 234, 236. For example, the matching resource filter 120 can filter out matching resources associated with sponsors from different geo-locations than the user 104a.

In some implementations, filtering may be based at least in part on a size of a business associated with the one or more example resources, including filtering out businesses associated with matching resources that are a different size. For example, the size (e.g., number of employees, amount of profit or sales, etc.) of a business associated with the example resource 212 can be identified by the resource providing system 110 and compared with the sizes of businesses associated with the matching resources 232, 234, 236. Matching resources associated with businesses of different sizes (e.g., a substantially greater or lesser number of employees, a substantially greater or lesser amount of profit or sales, etc.) from a business associated with the example resource 212 can be filtered out by the matching resource filter 120, for example.

In some implementations, filtering may be based at least in part on spend data associated with a sponsor of the one or more example resources, including filtering out sponsors of matching resources that have spend data that is substantially different from the spend data associated with the sponsor of the one or more example resources. For example, spend data may be related to advertising campaigns, advertising auctions, and other expenditures by sponsors of resources. Spend data associated with a sponsor of the example resource 212 can be identified by the resource providing system 110 and compared with spend data associated with sponsors of the matching resources 232, 234, 236. Matching resources associated with spend data substantially different (e.g., greater, lesser, more frequent, less frequent) from spend data associated with the example resource 212 can be filtered out by the matching resource filter 120, for example.

The filtered matching resources can be provided (314) for output to the consumer. For example, the resource providing system 110 can provide one or more of the matching resources 232, 234, 236, 238 to the user 104a via networks 106 and client computing device 102a. As another example, the resource providing system 110 can provide matching resources to another user 104n. In some implementations, sponsor information may be provided in association with matching resources. For example, contact information, profile information, and/or financial information associated with each of the provided matching resources can be provided to the client computing device 102a and can be presented to the user 104a via an interface. The user 104a (e.g., a sales representative), for example, may use the provided matching resources and associated information (e.g., such as spend data). The matching resources and associated information can be used, for example, as sales leads or for comparative purposes (e.g., to compare spend data). Thus, in the present example, by providing one or more websites of current customers to the resource providing system 110, and by receiving similar websites from the system, sales representative may receive assistance in identifying potential customers.

Figure 4:
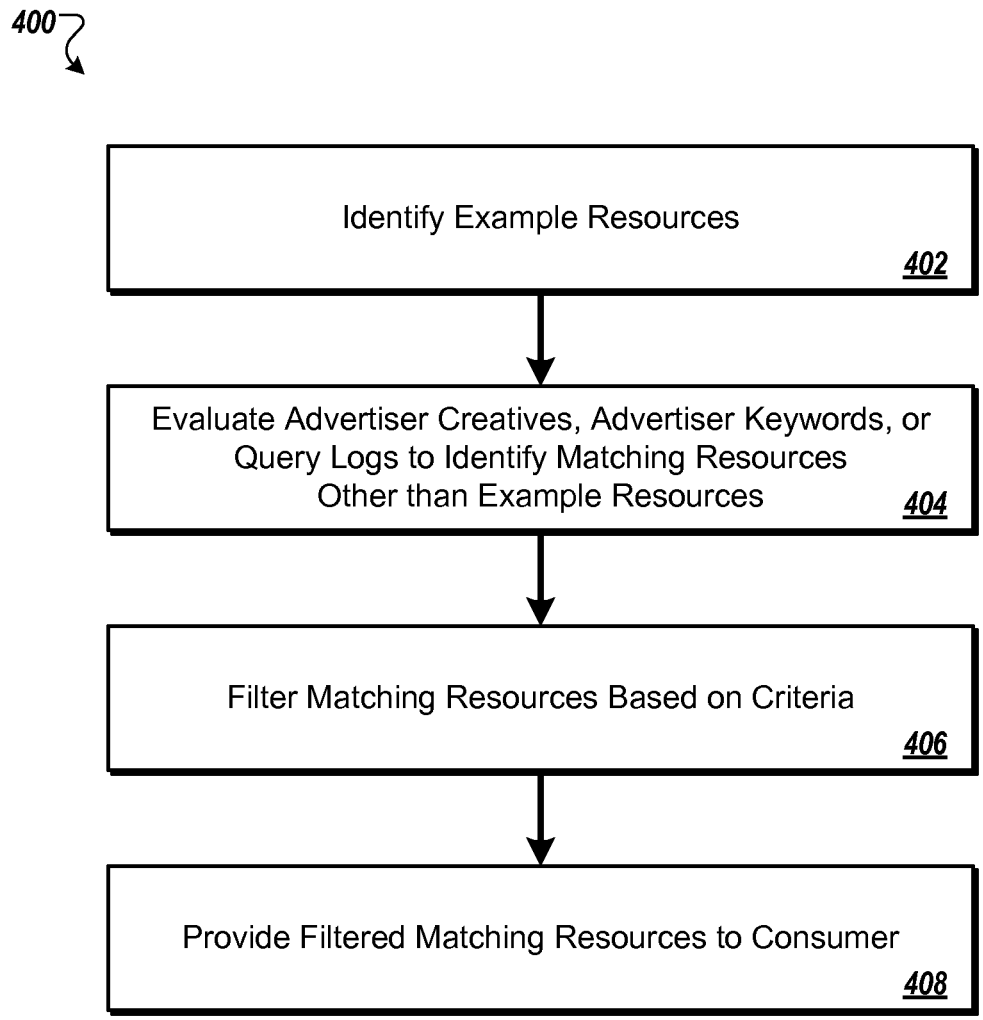

FIG. 4 is a flowchart of an example process 400 for providing resources. In some implementations, the process 400 may be performed by the systems 100, 200, and will be described as such for the purpose of clarity. Briefly, the process 400 includes identifying example resources, evaluating one or more advertiser creatives, advertiser keywords, and/or query logs to identify matching resources other than the example resources, filtering the matching resources based on one or more criteria, and providing filtered matching resources to a consumer.

One or more example resources can be identified (402). For example, the resource identifier 112 can identify resources (e.g., websites, content, information associated with organizations or individuals, etc.) received by the resource providing system 110.

For each example resource, one or more advertiser creatives (e.g., advertising content, such as graphics and type), advertiser keywords (e.g., keywords supplied for a targeted advertising campaign), or query logs can be evaluated (404). For example, the content evaluator 114 can evaluate content and the query log evaluator 116 can evaluate query logs associated with the example resource 212. One or more matching resources other than the example resources that are a match based on the advertiser creatives, advertiser keywords, and/or query logs can be identified. For example, the matching resource identifier 118 can identify resources other than the example resource 212 that are associated with similar advertiser creatives, similar advertiser keywords, and/or similar query logs. On or more matching resources may, for example, be associated with sponsors (e.g., organizations, businesses, advertisers) that have engaged in advertising campaigns similar to the example resource 212, and/or may be related to similar query logs as the example resource 212.

The one or more matching resources can be filtered (406) based on one or more criteria. For example, the matching resource filter 120 can perform filtering operations as described in connection with FIG. 3. The filtered matching resources can be provided (408) for output to a consumer. For example, the resource providing system 110 can provide one or more matching resources to the user 104a via networks 106 and client computing device 102a.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
identifying an example resource that (i) is capable of displaying an advertisement in a first region of the example resource and (ii) is capable of displaying content other than the advertisement in a second region of the example resource, wherein the example resource is an example of a type of resource that an advertiser desires to target with a campaign;
identifying one or more query logs that include a plurality of entries, wherein each entry among at least a subset of the plurality of entries includes a query that was received and an identification of a resource that was selected as responsive to the query;
evaluating the one or more query logs to determine one or more queries that resolved to the example resource;
based on the evaluating, identifying one or more matching resources, other than the example resource, to which the one or more determined queries also resolved;
identifying one or more characteristics of a first entity that is associated with the example resource and one or more characteristics of one or more second entities that are respectively associated with the one or more matching resources;
comparing the one or more characteristics of the first entity with the respective one or more characteristics of each of the one or more second entities to determine respective similarity scores between the first entity and each of the one or more second entities;
filtering the one or more matching resources to identify at least one of the one or more matching resources as being relevant to the advertiser based on the respective similarity scores for the at least one of the one or more matching resources satisfying a threshold similarity score; and
providing the at least one of the one or more matching resources to the advertiser as at least one lead to target with the campaign.

2. The method of claim 1 wherein identifying the example resource includes receiving the example resource from a user.

3. The method of claim 1 wherein the example resource is a website.

4. The method of claim 1 wherein filtering the one or more matching resources further includes ranking the one or more matching resources.

5. The method of claim 1 wherein filtering the one or more matching resources includes filtering based at least in part on spend data associated with the first entity, including filtering out at least one of the one or more second entities associated with the one or more matching resources that have spend data that is substantially different from spend data associated with the first entity.

6. The method of claim 1 wherein filtering includes filtering based at least in part on a number of historical clicks in a time period associated with matching resources.

7. The method of claim 1 wherein evaluating the one or more query logs comprises removing one or more words identified from the determined queries prior to locating the one or more matching resources.

8. The method of claim 1 wherein filtering includes removing particular matching resources, from the one or more matching resources, that are determined to be associated with irrelevant second entities.

9. The method of claim 1 wherein filtering includes removing directories from the one or more matching resources.

10. The method of claim 1 wherein filtering includes determining a vertical classification associated with the example resource and filtering out matching resources that do not match the vertical classification.

11. The method of claim 1 where filtering includes ranking the matching resources based at least in part on a frequency of the matching resource being returned in response to the one or more queries.

12. The method of claim 1 wherein a first of the second entities is a sponsor of the matching resource associated with the first of the second entities.

13. The method of claim 1 wherein the one or more query logs include organic search results derived from a submission of the one or more queries to a search engine.

14. A method comprising:
receiving from a consumer an indication of an example resource, wherein the example resource is an example of a resource that is similar to other resources that the consumer is seeking to identify, wherein the example resource is a web resource that includes one or more slots for supporting advertisements, the advertisements being provided by the consumer or other consumers;
identifying one or more query logs that include a plurality of entries, wherein each entry among at least a subset of the plurality of entries includes selection criteria that was received and an identification of an advertisement that was selected as responsive to the selection criteria;
using the identified query logs, determining one or more matching resources other than the example resource that are a match for ones of the selection criteria;
identifying one or more characteristics of a first entity that is associated with the example resource and one or more characteristics of one or more second entities that are respectively associated with the one or more matching resources;
comparing the one or more characteristics of the first entity with the respective one or more characteristics of each of the one or more second entities to determine respective similarity scores between the first entity and each of the one or more second entities;
filtering the one or more matching resources to identify at least one of the one or more matching resources as being relevant to the consumer based on respective similarity scores for the at least one of the one or more matching resources satisfying a threshold similarity score; and
providing the at least one of the one or more matching resources to the consumer as at least one lead for an advertising campaign.

15. A system comprising:
a processor; and
a storage medium including software that when executed by the processor provides resources to advertisers, the software including a resource identifier, a query log evaluator, a matching resource identifier, and a matching resource filter;
wherein the resource identifier is enabled to identify an example resource that (i) is capable of displaying an advertisement in a first region of the example resource and (ii) is capable of displaying content other than the advertisement in a second region of the example resource, wherein the example resource is an example of a type of resource that an advertiser desires to target with a campaign;
wherein the query log evaluator is enabled to identify queries in a query log, wherein a given entry in the query log includes a query that was received and an identification of a resource that was selected as responsive to the query, and wherein identifying queries includes evaluating the query log entries to determine one or more queries that resolved to the example resource;

wherein the matching resource identifier is enabled to identify one or more matching resources, other than the example resource, to which the one or more determined queries also resolved;

wherein the matching resource filter is enabled to filter the one or more matching resources by (i) identifying one or more characteristics of a first entity that is associated with the example resource and one or more characteristics of one or more second entities that are respectively associated with the one or more matching resources, (ii) comparing the one or more characteristics of the first entity with the respective one or more characteristics of each of the one or more second entities to determine respective similarity scores between the first entity and each of the one or more second entities, and (iii) selecting at least one of the one or more matching resources that have similarity scores that satisfy a threshold similarity score; and wherein the system is enabled to provide the at least one of the one or more matching resources selected by the matching resource filter to the advertiser as at least one lead to target with the campaign.

16. The method of claim 1, wherein:

identifying the one or more characteristics of the first entity comprises identifying a geographical location of the first entity;

identifying the one or more characteristics of the one or more second entities comprises identifying respective geographical locations of the one or more second entities;

comparing the one or more characteristics of the first entity with the respective one or more characteristics of each of the one or more second entities comprises determining respective distances between the geographical location of the first entity and the respective geographical locations of the one or more second entities;

the respective similarity scores indicate the respective distances between the geographical location of the first entity and the respective geographical locations of the one or more second entities; and filtering the one or more matching resources comprises determining that the at least one second entity associated with the at least one of the one or more matching resources is located within a threshold distance of the geographical location of the first entity.

17. The method of claim 1, wherein:

identifying the one or more characteristics of the first entity comprises identifying an organizational size of the first entity;

identifying the one or more characteristics of the one or more second entities comprises identifying respective organizational sizes of the one or more second entities;

comparing the one or more characteristics of the first entity with the respective one or more characteristics of each of the one or more second entities comparing the organizational size of the first entity with the respective organizational sizes of the one or more second entities; and filtering the one or more matching resources comprises selecting the at least one of the one or more matching resources based on the at least one corresponding second entity associated with the one or more matching resources having similar organizational size as the first entity.

18. The method of claim 1, wherein filtering the one or more matching resources comprises:

ranking the one or more matching resources based on the similarity scores of the one or more matching resources; and selecting one or more top-ranked matching resources as the at least one of the one or more matching resources to provide to the advertiser.

* * * * *